Figure 3:
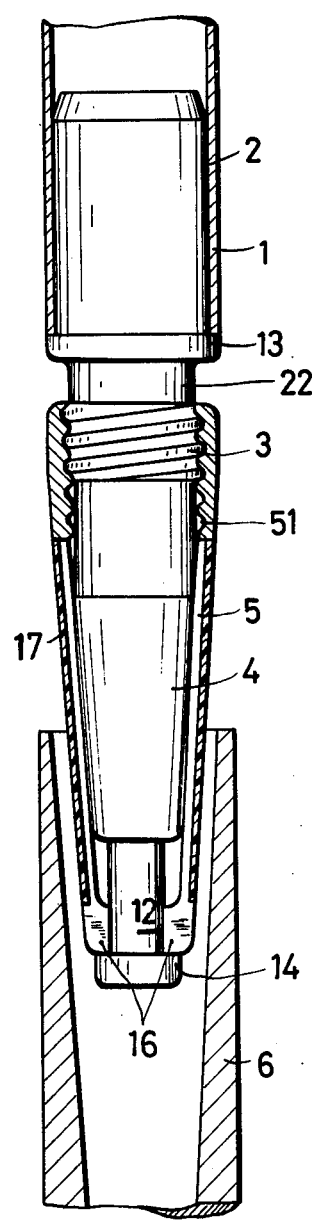

United States Patent [19]

Achenbach et al.

[11] 4,152,086  
[45] May 1, 1979

[54] TAPERED CONNECTOR

[75] Inventors: Dieter Achenbach; Walter Kolb, both of Betzdorf; Siegfried Joswig, Kausen, all of Fed. Rep. of Germany

[73] Assignee: Wolf-Gerate GmbH, Fed. Rep. of Germany

[21] Appl. No.: 835,331

[22] Filed: Sep. 21, 1977

[30] Foreign Application Priority Data

Sep. 22, 1976 [DE] Fed. Rep. of Germany ....... 2629578  
Apr. 27, 1977 [DE] Fed. Rep. of Germany ....... 2713248

[51] Int. Cl.² ........................... B25G 3/00; F16B 7/02
[52] U.S. Cl. .................................. 403/334; 403/297; 403/372; 403/361
[58] Field of Search ............... 403/333, 334, 243, 365, 403/366, 367, 372, 351, 309, 313, 314, 297, 361

[56] References Cited

U.S. PATENT DOCUMENTS

| Re. 23,885 | 10/1954 | Hubbard | 403/243 X |
| 750,343 | 1/1904 | Brockway | 403/334 X |
| 2,199,532 | 5/1940 | Weeks | 403/372 X |
| 2,356,835 | 8/1944 | Duckett | 403/372 X |

FOREIGN PATENT DOCUMENTS 700295 12/1940 Fed. Rep. of Germany .......... 403/243

Primary Examiner—Wayne L. Shedd  
Attorney, Agent, or Firm—Ostrolenk, Faber, Gerb & Soffen

[57] ABSTRACT

A connector comprising a tapered socket component, a complementary tapered spigot component and a sleeve component for location between the socket component and the spigot component, the sleeve component and one of the other components being screw engageable, whereby, in use, screwing together of these components laterally deforms the sleeve component to clamp the spigot component within the socket component.

22 Claims, 7 Drawing Figures

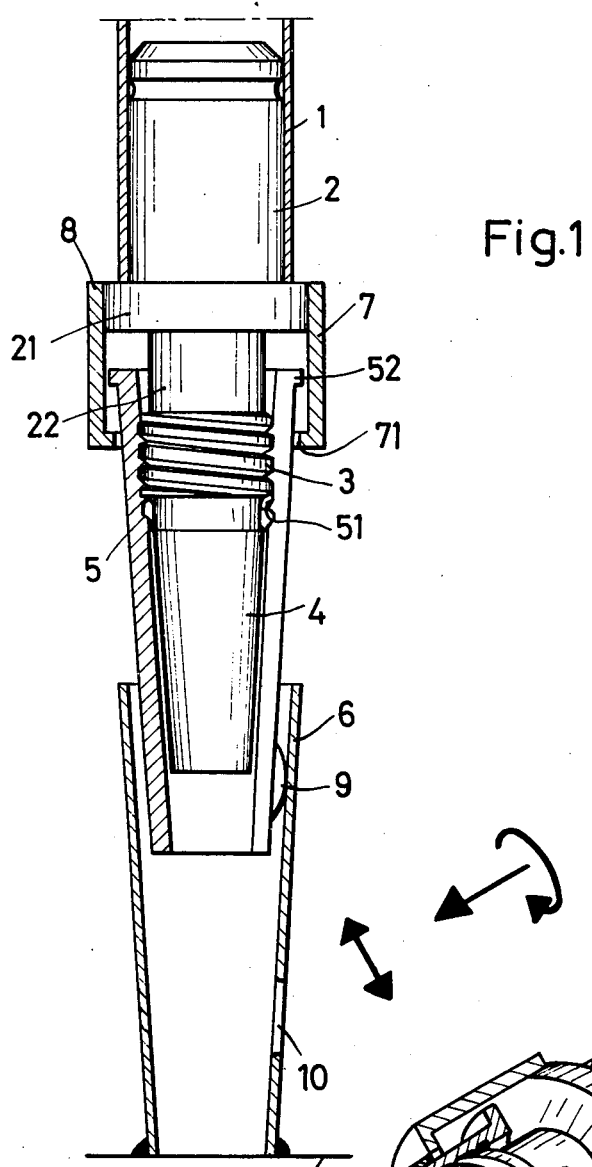
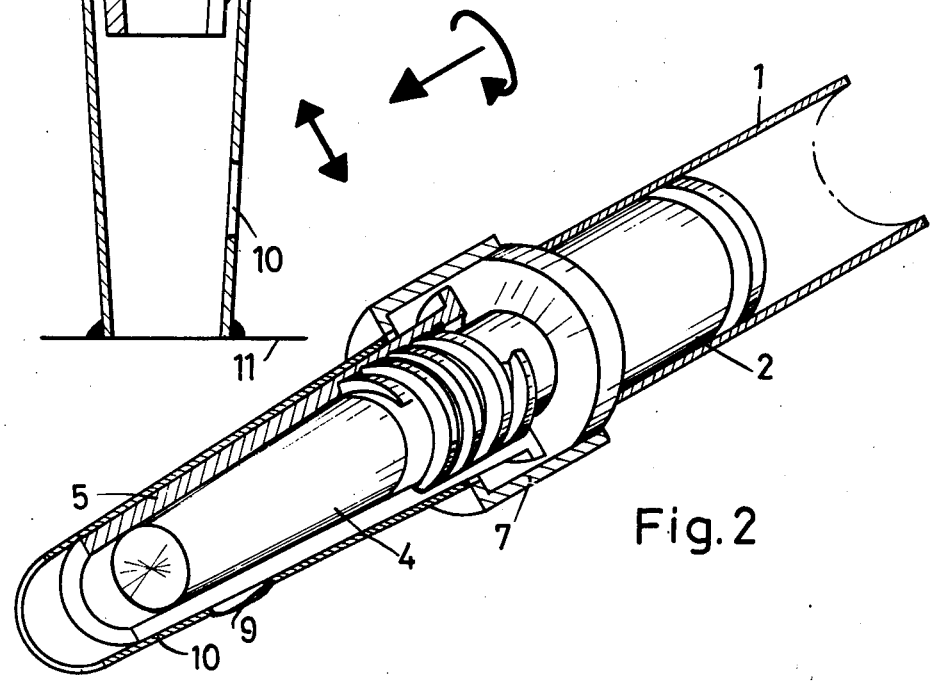

TAPERED CONNECTOR

The invention relates to a connector, for example, connecting a tool to a handle, such as a house or garden tool.

It is known to provide a tapered socket on the tool for receiving a tapered portion of a handle pushed into the socket. This type of connection between a tool and its handle has stood the test of time, in practice, especially between a garden tool such as a rake and its handle. When the handle, usually of wood, is lightly knocked against the ground, its tapered end portion, which is usually provided with longitudinal grooves, is wedges into the socket on the tool. This type of connection is very simple in construction, is simple to effect, and the wedge action can be great enough to ensure that the tool is reliably and durably connected with the handle without the necessity of providing a transverse fixing element (nail, screw) across the joint. Connections of this kind may, however, become loose when the wood is allowed to dry out and shrink and there is a danger of inexperienced users having difficulty in wedging the handle into the socket, especially if the latter is not symmetrically located on the tool. Also, it may be difficult to disassemble the parts once the tapered end portion of the handle has been expertly wedged in position.

According to the present invention, there is provided a connector comprising a tapered socket component, a complementary tapered spigot component and a sleeve component for location between the socket component and the spigot component, the sleeve component and one of the other components being screw engageable whereby, in use, screwing together of these components laterally deforms the sleeve component to clamp the spigot component within the socket component.

The invention also resides in a connector comprising a tapered spigot component and a sleeve component, the spigot component being screw engageable in the sleeve component to cause lateral deformation of the latter, whereby, in use, with the sleeve component inserted in a complementary socket component, the lateral expansion wedges the sleeve component in the socket component to secure the latter to the spigot component.

The spigot component may be provided with a cylindrical thread which interacts with an internal thread of the sleeve component, or a self-tapping thread on the spigot component may cut the corresponding thread into the internal surface of the sleeve component. Preferably, however, both of the two connected parts will be provided with their own threads, the length of the threads inside the sleeve component being great enough to ensure that the sleeve component can be sufficiently expanded to match the dimensions of various sockets which may have different internal diameters.

To avoid losing the sleeve before the handle and tool are assembled, a bush may be incorporated into the design to hold the sleeve component in position on the spigot component with the aid of flanges.

In one embodiment, the spigot component, the sleeve component and the bush used for locating the sleeve are supplied together, as a complete unit, including a plug for insertion into an aluminium tube which constitutes the handle, or is mounted on a wooden handle.

All parts of the connector preferably are made of plastics material. The sleeve may be provided with a detent engageable in a recess in a socket component on the tool, to engage with the latter when the sleeve is inserted to a predetermined depth.

The sleeve component may comprise an inner sleeve, and an outer sleeve, made of elastic material, which has a higher coefficient of friction than the plastics material with which the inner sleeve is made. The sleeve component, therefore, provides the frictional engagement with the socket component. There is no need for additional connections nor is it necessary to ensure that the relative positions of socket component and sleeve component are in perfect alignment; the parts may be tightened in any relative rotational position.

The outer sleeve, preferably consisting of rubber, may be received in a recess in the inner sleeve manufactured by turning the material to a depth which corresponds to the wall thickness of the outer sleeve, the latter being supported at one end against the threaded section of the sleeve component and at the other end against a flange.

The threaded section of the sleeve component is not divided by slots; there are, however, several slots which extend at equal angular spacing from the threaded section to the opposite end, to improve deformability.

In order to prevent the sleeve component from being lost and more especially to prevent it from being trapped in the socket component when the sleeve component is pulled out of the latter, the spigot component may be provided with a reduced thickness end portion or shaft which at its end carries a head. The end of the sleeve component can abut against this head.

The elastic strips defined by the slots, are provided with end members which project inwardly so as to slide on the shaft, the head and the shoulder at the opposite end of the shaft serving to captivate the sleeve component.

The invention may additionally be used in the assembly of handles or poles which may have to be divided into shorter sections. Each pole or handle consists of a number of sections provided with socket components and connectors, so that the pole or handle may be extended as required for a given purpose, or disassembled into shorter lengths for storage purposes. It is, for example, considered an advantage for tools used for the care of a grave to be equipped with a sectioned handle so that the tool may be taken to the cemetary in a conventional shopping bag or the like, to be assembled as required. This system permits joining any number of short sections together to build up a tool handle having the length of a conventional, continuous handle. These shorthandles are conveniently provided with sockets accommodated in a bush pushed over a tube, which may, at the same time, serve as a convenient grasp.

Figure 5:
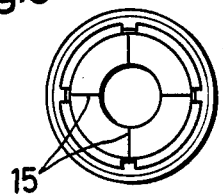
Figure 4:
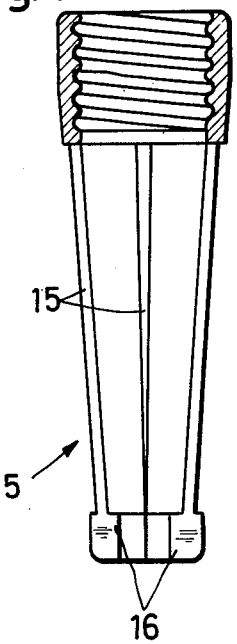
Figure 6:
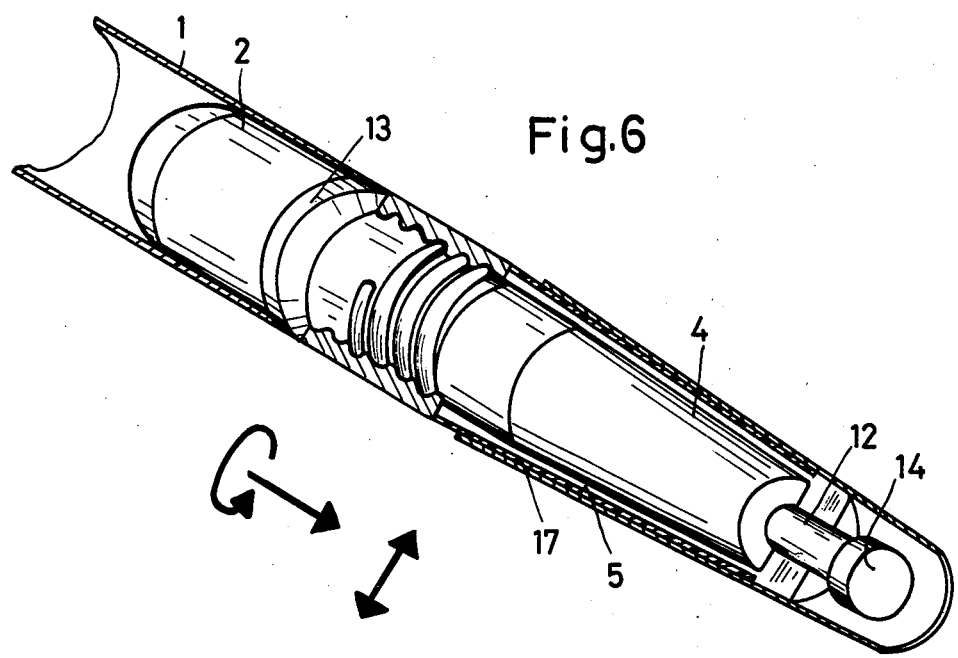

Reference is now made to the accompanying drawings which show in:

FIG. 1   A first embodiment of a connector according to the invention, in cross-section;

FIG. 2   The connector of FIG. 1, in perspective and partly cut away;

FIG. 3   A second embodiment of a connector according to the invention, in cross-section;

FIG. 4   A detail of a conical bush of the connector of FIG. 3, in cross-section;

FIG. 5   An axial end view view of the conical bush of FIG. 4;

FIG. 6   The connector of FIG. 3 in perspective and

Figure 7:
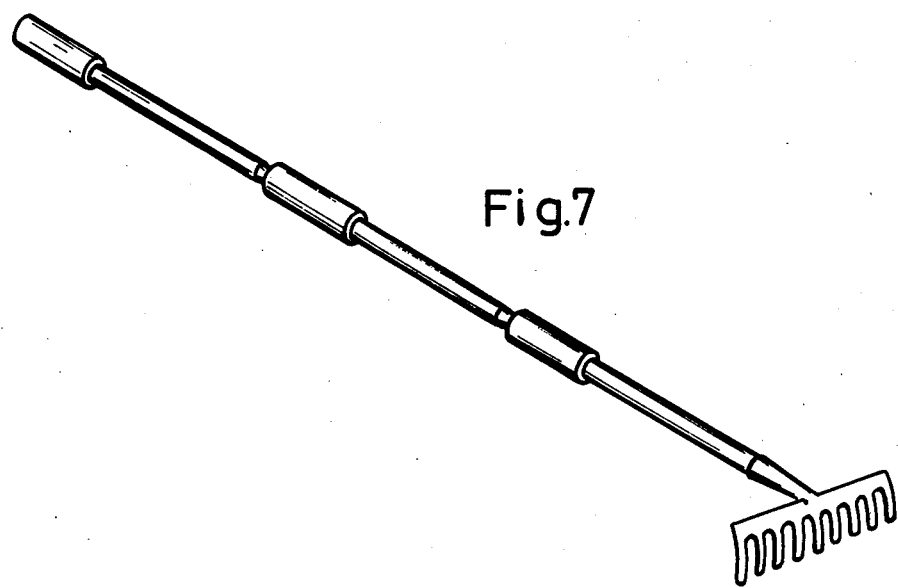

FIG. 7   A perspective view of a rake having a handle connected to a rake head and having two connectors according to the invention, permitting disassembly of the rake into three parts.

In FIGS. 1 and 2 a bush 1 is shown, which may be either the lower end section of a metal tube, serving as a tool handle or an adaptor-bush, fixed to the lower end section of a wooden or plastics handle. A connector is provided with a plug 2, which may have peripheral radially projecting ribs (in a manner known, for example, from the design of plastics bottle stoppers). The plug 2 is inserted into the bush 1 to an extent determined by an outwardly extending flange 21 which is firmly fixed to the plug 2. Co-axial with the plug and also firmly fixed to the flange is a cylindrical part 22 which merges into a frusto-conical end part 4. The cylindrical part 22 is provided with an external thread 3, onto which an internal thread 51 of a frusto-concial sleeve 5 is screwed. The sleeve is axially slotted to increase its resilience. The sleeve 5, in turn, is driven into a frusto-conical socket 6 on a tool 11, a dog 9, on the sleeve 5, engaging with a recess 10 in the socket 6. Although this "click-in" connection 9, 10 is not vital, it has been included because it ensures that the parts are correctly assembled. Alternatively, the surface of the sleeve 5 may be roughened in order to imrpove the friction in the joint between the sleeve 5 and the socket 6.

In assembly, the cylindrical part 22 is either not engaged or is only loosely engaged in the sleeve, as the sleeve is inserted into the socket 6. Once the sleeve is fully engaged in the socket 6, the handle is turned, so that the cylindrical part 22 is forced down the screw threads 51 of the sleeve 5 and expands the sleeve to provide a strong wedging of the sleeve in the socket, which resists torisonal displacement and has high tensile strength.

In order to ensure that the sleeve 5 is not lost before the connector is assembled and, more especially, to facilitate its removal from the socket 6 after the radial load has been taken off, by screwing the cylindrical part 22 out of the sleeve, the rear end 8 of a cap 7 is glued or welded onto the flange 21. An inwardly projecting annular flange 71 of the cap 7 captivates an outwardly projecting annular flange 52 on the sleeve 5. In this manner, the sleeve 5 is loosely held and is capable of a limited axial displacement.

To disconnect the parts, the handle is turned in the opposite direction causing cylindrical part 22 to disengage from the screw threads of the sleeve 5. As a result, the sleeve 5 being slotted, and in consequence of an inherent springiness, regains its previous form, the wedging force between the sleeve 5 and the socket 6 being reduced accordingly.

With the embodiment according to FIGS. 3 to 6, the bush 1, which may be an aluminum tube, contains dodecagonal plug 2 pressed into the tube. This plug 2 comprises a collar 13, the diameter of which corresponds to the outer diameter of the bush 1 and enables the annular end face of the bush to abut against the collar. Adjacent to the collar 13 is a short, first cylindrical section 22 which extends into a threaded section 3 and subsequently into another cylindrical section which merges into a frusto-conical section 4. A shaft 12 projects co-axially from the frusto-conical section and carries at its free end a head 14. The parts 2, 13, 3, 4, 5, 12 and 14 including the cylindrical sections between them, may be integral parts of a moulded or extruded plastics component.

The frusto-conical section 4 is complemented by a bush 5. The latter comprises a cylindrical collar with an internal thread 51 and a frusto-conical section which is divided into four elastic blades by slots 15, the blade ends being provided with inwardly extending members 16 which slidably engage with the shaft 12. The slotted section of the bush 5 includes a step holding a sleeve 17 which consists of an elastic material, preferably rubber.

The bush 5 is inserted into the socket 6 on the tool, as shown in FIG. 3, until the sleeve 17 wedges in the socket. Now the tubular handle is turned so that the second cylindrical portion 3 is screwed into the bush 5. While being screwed in, the frusto-conical section 4 widens the slotted bush 5, especially in the region covered by the elastic sleeve 17, the flexible blades being forced outwards so that they press the elastic sleeve 17 against the socket 6, causing it to act as a seal.

When the relative positions of the various parts conform to those according to FIG. 3, during unscrewing of the handle, the handle can be withdrawn and the head section 14 captivates the bush 5 so that it is removed with the handle instead of being left behind in the socket where it might adhere more or less firmly to the socket surface. The axial support provided by the head section 14 for the wider end sections of the flexible blades, both facilitates removal and protects the bush against being accidentally lost.

It is easy to assemble the parts of the connector. The connector is supplied with, or without a handle. It may be preferred to supply the handle, in which case the plug 2 is fixed to the handle by the manufacturers.

When the bush 5 is screwed on to the thread 3, the flexible blades formed by the slots 15 widen out so that the end projections 16 of the blades can slide over the head section 14 and subsequently, during removal of the handle, allow the projections to drop radially on to the shaft 12. The rubber sleeve 17 holds the blades in the radial direction, guiding them inwards and consequently ensures that the bush cannot be lost.

The consecutive movements are indicated by the schematic arrows in FIG. 6. By turning the handle, the end section 4 of the handle is driven into the bush 5, so that the latter is widened in the radial direction, and clamped inside the socket 6.

FIG. 7 shows the connecting unit used as a means of changing the handle length, a connector being provided at each joint between end sections.

The plug 2 including all elements which are integrally connected with it, may consist of a plastics material or aluminum or any other suitable material. If it does consist of a plastics material it is advisable to incorporate in the extrusion or moulding the shaft 12 including its head 14, as an integral steel insert for strength.

The above described connector provided for the fastening of tool handles is cheap; it ensures that the frictional connection is reliable; moreover, no skill is required for an effortless assembly of the parts. Repeated dismantling and reassembly have no detrimental effect on the holding power of the connection. These facts open a considerably increased field of application for the invention. The system is not limited to the fastening of handles for tools for the home and garden; it is equally suitable for the adaptation of tools used for example for window cleaning.

What we claim is:

1. A connector comprising a tapered spigot component and a substantially complementary tapered sleeve component, the spigot component being screw engageable in the sleeve component to cause lateral deformation of the latter, whereby, in use, with the sleeve component inserted in a complementary socket component, the lateral expansion wedges the sleeve component in the socket component to secure the latter to the spigot component, the spigot component and the sleeve component being provided with abutment means opposing each other in an axial direction and permitting limited axial movement of the sleeve component relative to the spigot component.

2. A connector according to claim 1, wherein the sleeve component has a slotted portion to facilitate lateral deformation.

3. A connector according to claim 1, wherein the internal screw thread of the sleeve component is frusto-conical following the inner surface contours of the sleeve component, which are also frusto-conical, and the external thread on the spigot component is cylindrical, whereby screwing of the cylindrical thread into the frusto-conical thread expands the sleeve component.

4. A connector according to claim 2, wherein the screw threads on the sleeve component and the spigot component are both cylindrical and the tapered spigot component causes lateral expansion of the sleeve component.

5. A connector according to claim 1, wherein the sleeve component comprises a laterally expansible inner sleeve provided with said screw thread, and an elastic outer sleeve resiliently resisting the expansion.

6. A connector according to claim 5, wherein the outer sleeve is made of rubber.

7. A connector according to claim 5, wherein the outer sleeve is recessed into a reduced diameter portion of the inner sleeve.

8. A connector according to claim 5, wherein the inner sleeve is slotted so as to define a plurality of resilient, axially extending blades lying on an imaginary frusto-conical surface.

9. A connector according to claim 8, wherein the spigot component has an axially projecting reduced diameter end portion terminating in a head and defining one of said abutment means and the blades have end portions defining inward projections as the other one of said abutment means which engage with the reduced diameter end portion of the spigot component to be captivated between the adjacent wider diameter end portion of the spigot component and the head.

10. A connector according to claim 9, wherein the end portion of the blades are deflectable during expansion of the sleeve component to pass over the head, the outer sleeve urging said end portions back into engagement with the reduced diameter end portion of the spigot component during withdrawal of the latter.

11. A connector according to claim 2, wherein the spigot component is provided with a plug for securance in a socket portion of a handle.

12. A connector according to claim 1, wherein a bush is provided on the spigot component, the sleeve component being located with a portion within the bush, and the sleeve component and the bush having said abutment means captivating the sleeve component and permitting limited axial movement of the sleeve component relative to the spigot component.

13. A connector according to claim 12, wherein the spigot component is provided with means for securing the same in a socket portion of the handle, and wherein the bush is mounted on a flange adjacent the plug, the flange determining the maximum extent to which the plug can be inserted in a handle socket.

14. A connector according to claim 11, wherein the plug and the spigot component form parts of a single plastics moulding.

15. A connector according to claim 14, wherein the reduced diameter end portions of the spigot component and its head are defined by a metal member insert-moulded in said plastics moulding.

16. A handle and connector assembly for attachment to a socket component in a member, wherein the connector is constructed according to any one of claim 1 and the handle is secured to the spigot component.

17. A handle and connector assembly according to claim 16, wherein the handle is provided with a socket end which receives a plug with which the spigot component is provided.

18. A handle and connector assembly according to claim 17, wherein the handle is composed of a length of tubular material, one end of which defines said socket end.

19. A dismantlable assembly including a handle and connector assembly according to claim 16, and a member provided with a socket component, wherein the sleeve component, together with the spigot component, is engageable in the socket component for attaching the handle to the member.

20. A dismantlable assembly according to claim 19, wherein the sleeve component has a detent engageable in a recess in the socket component.

21. A dismantlable assembly according to claim 19, wherein at least one of the engagement surfaces of the sleeve component and the socket component is roughened.

22. A dismantlable assembly according to claim 19, wherein said member is a handle section.

* * * * *

UNITED STATES PATENT AND TRADEMARK OFFICE
CERTIFICATE OF CORRECTION

PATENT NO. : 4,152,086
DATED : May 1, 1979
INVENTOR(S) : Dieter Achenbach; Walter Kolb and Siegfried Joswig It is certified that error appears in the above–identified patent and that said Letters Patent are hereby corrected as shown below:

Under FOREIGN APPLICATION PRIORITY DATA please change "2629578" to -- 7629578 -- and "2713248" to -- 7713248 --.

Signed and Sealed this

Twenty-eighth Day of August 1979

[SEAL]

Attest:

Attesting Officer

LUTRELLE F. PARKER
Acting Commissioner of Patents and Trademarks